Aug. 4, 1959 C. J. FITCH 2,897,934
ELECTROADHESIVE CLUTCH
Filed Aug. 15, 1956 2 Sheets-Sheet 1
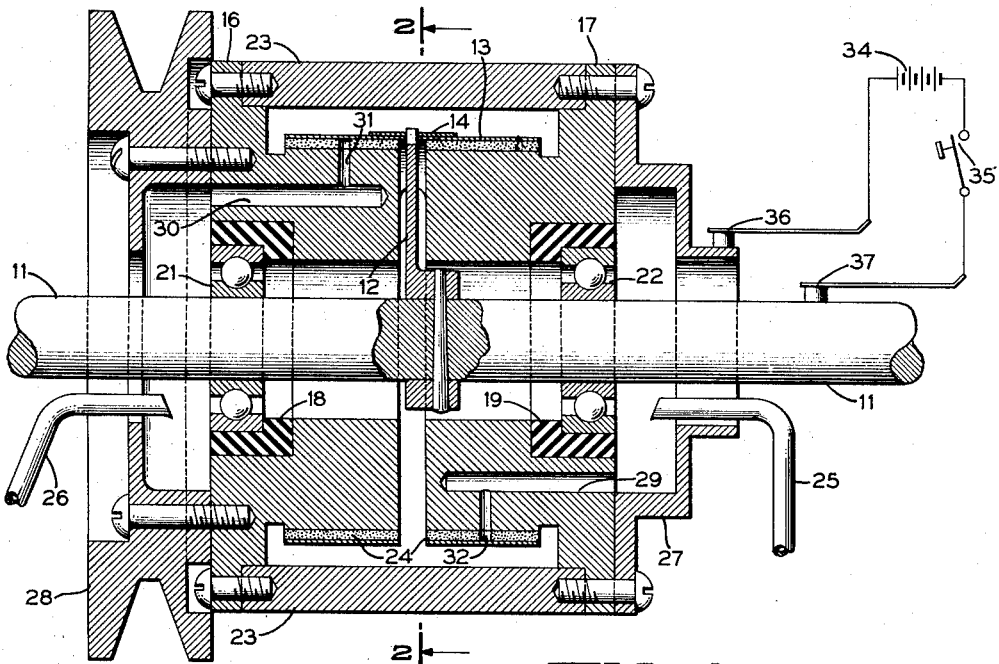
FIG_1_
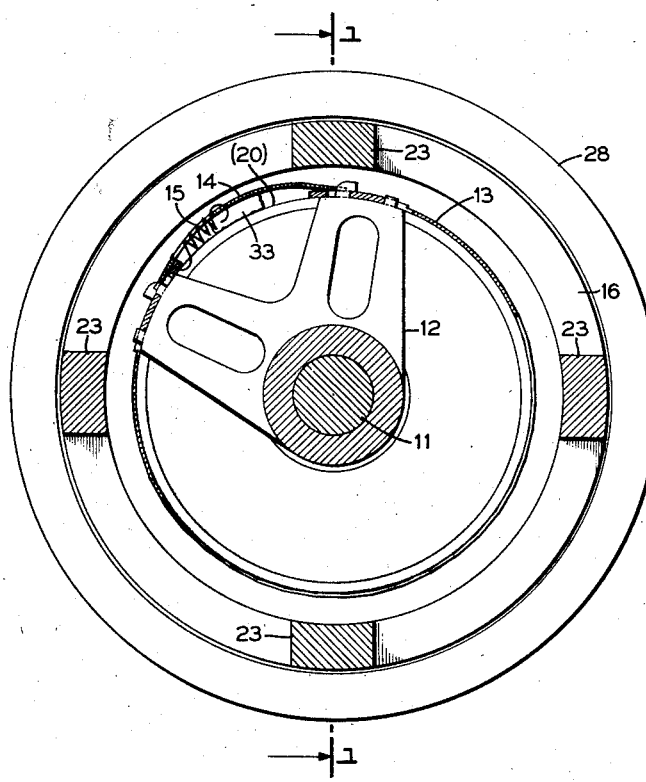
FIG_2_
INVENTOR.
CLYDE J. FITCH
BY John P. Dority
ATTORNEY Aug. 4, 1959 C. J. FITCH 2,897,934
ELECTROADHESIVE CLUTCH
Filed Aug. 15, 1956 2 Sheets-Sheet 2

United States Patent Office 2,897,934
Patented Aug. 4, 1959

2,897,934

ELECTROADHESIVE CLUTCH

Clyde J. Fitch, Endicott, N.Y., assignor to International Business Machines Corporation, New York, N.Y., a corporation of New York Application August 15, 1956, Serial No. 604,133

9 Claims. (Cl. 192—84)

This invention relates to electroadhesive devices wherein the operation depends upon the electroadhesive forces between a conductive member and a co-operating semi-conductive member under the influence of an electrical potential difference.

More particularly, this invention is directed to electroadhesive clutches wherein a driven member is clutched to a driving member by electroadhesive forces.

The electroadhesive effect between conductors and semiconductors is well known in the art and there are hundreds of materials that will exhibit electroadhesion under some conditions. In this art, a number of improvements and modifications have been made in efforts to obtain reliable devices. Early in these attempts to obtain a usable electrostatic or electroadhesive device, an agate or similar stone cylinder was used as a clutch wheel. Moisture from an electrolyte within the porous cylinder rendered it what has been termed a "semiconductor." As used hereinafter, a "semiconductor" will be defined as a resistance material having a resistivity within the general range of $10^6$ to $10^7$ ohms per cubic centimeter. Among the defects in these early devices were the following: electrolysis (ionic conduction) and eventual erosion of the clutch surfaces, resulting from the use of an electrolyte; variations in resistance and torque caused by evaporation; and non-uniform torque around the periphery because of the anisotropic characteristics of natural stone. From this point, the use of alternating current was partially successful in avoiding electrochemical alterations in the device, and a synthetic stone, fabricated of materials such as powdered flint bonded together with conductive material such as water glass, was isotropic but remained hygroscopic. However, even with these improvements, only devices of erratic operation, particularly at high operating speeds, were possible. In further attempts to produce a reliable electroadhesive device, semiconductive materials of electronic conduction were fabricated from mixtures such as magnesium and titanium oxides. But these and all the prior attempts resulted in unstable electroadhesive devices, particularly unreliable at high operating speeds.

In addition to the above defects, amplified wear of the clutching surfaces was caused by dust particles acting as an abrasive between the surfaces. These dust particles were produced by wear, due to surface friction, and erosion, due to making and breaking electrical current passing through the surface contact. This amplified wear resulted in alterations of the quality of the clutching surfaces, i.e., smoothness and shape, and produced unstable and unreliable operation. In attempts to prevent this amplified wear, brushes were used as wipers to remove the abrasive particles. However, the brushes became saturated with the abrasive dust particles and ceased to function.

Even though a primary advantage of an electroadhesive clutch over other similar devices is rapid electrical response time (of the order of microseconds), this advantage was not, in practice, available for most applications because of erratic operation and unreliability. In addition to rapid response time, an electroadhesive clutch has many other potential advantages not found in similar devices. Low operating current (of the order of 1 to 10 milliamperes at 200 volts), noninductive circuit operation, low manufacturing cost, and small size in relation to torque output are examples of these advantages.

The copending applications, Serial Nos. 556,644 now abandoned and 556,676 of the present inventor, filed December 30, 1955, and assigned to the present assignee, disclose and claim improved electroadhesive clutches wherein reliability and stability are obtained with a novel semiconductive material and lubricating dielectrics.

The present invention is directed to an improved electroadhesive clutch, generally of the type described and claimed in the above-mentioned copending applications, wherein improved electroadhesion and greatly reduced residual drag is obtained.

A primary object of this invention is to provide an improved electroadhesive clutch.

Another object is to provide an electroadhesive clutch with improved electroadhesion.

Another object is to provide an electroadhesive clutch with a reduced residual drag at no-voltage operating conditions.

Another object is to provide an electroadhesive clutch of improved efficiency.

A more particular object is to provide an electroadhesive clutch with co-operating clutching surfaces shaped for maximum efficiency in the use of the principle of electroadhesion.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a vertical longitudinal sectional view, partly diagrammatic, of an electroadhesive clutch constructed in accordance with the present invention and taken generally along the line 1—1 of Fig. 2.

Fig. 2 is a transverse sectional view taken generally along line 2—2 of Fig. 1.

Figure 3:
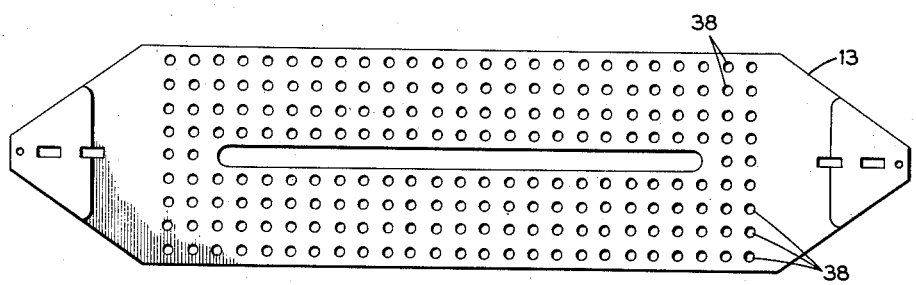
Fig. 3 is a developed top plan view of the band used in the clutch of Figs. 1 and 2.

Referring to Figs. 1 and 2 of the drawings, a shaft 11 has an arm 12 pinned thereto. A band 13, to be described more fully hereinafter, is engaged at both ends by the arm 12. A clip 14 is also carried by the arm 12 and a spring 15 secured to the clip 14 is attached to one end of band 13 to hold band 13 taut. Hubs 16 and 17 formed of a conductive material, preferably copper, are mounted by insulating bushings 18 and 19 on bearings 21 and 22 to freely rotate on shaft 11. The insulating bushings 18 and 19 thus electrically isolate hubs 16 and 17 from shaft 11. Hubs 16 and 17 are rigidly secured together by members 23 so that hubs 16 and 17 rotate in unison. Cylinders of semiconductive material 24 are bonded to hubs 16 and 17 to form clutch drums, the surfaces of which co-operate with the band 13. The semiconductive material is preferably comprised of conductive particles in an insulating binder. Preferably a lubricating dielectric film 20 is carried between the surfaces of cylinders 24 and band 13 as taught in the above-mentioned copending applications. One method of maintaining this dielectric film is shown in Fig. 1. Silicone oil, for example, is dropped from oil lines 25 and 26 into the circumferential spaces formed by conductive hub 27 and pulley 28. This oil is, by centrifugal force, carried through openings 29 and 30 in hubs 17 and 16 and through apertures 31 and 32 to the surfaces of the clutch drums. A sponge 33 secured to clip 14 and riding on the surfaces of cylinders 24 distributes the oil over the drum surfaces to maintain a uniform thin layer of lubricating dielectric between band 13 and the surfaces of cylinders 24. Means for applying an electrical potential difference between band 13 and the cylinders 24 are shown diagrammatically as battery 34 and switch 35. The positive terminal of battery 34 is connected to wiper 36 which rides on hub 27 to connect the positive side of the battery to hubs 16 and 17 and thus to the semiconductive cylinders 24. The negative side of battery 34 is connected through switch 35 to wiper 37. Wiper 37 rides on shaft 11 to connect the negative side of the battery to band 13 when switch 35 is closed. In practice, the polarity of the battery 34 may be reversed or the battery may be replaced by a source of alternating current voltage.

In operation, with pulley 28 and the clutch drum acting as the driving member and band 13 with the attached shaft 11 acting as the driven member, the clutch drum rotates and slides over the surface of band 13 when switch 35 is open. In this no-voltage condition a certain amount of residual drag between driving and driven members is present. When shaft 11 carries a load greater than the residual drag, the drag is dissipated as heat and shaft 11 remains stationary. The closing of switch 35 applies the potential of battery 34 between band 13 and the cylinders 24 to effect electroadhesion and thus engage the driving and driven members.

For a clutch of this type it is desirable that the no-voltage residual drag be as small as possible and the torque on applying a potential difference be as large as possible. Since electrostatic attraction is directly proportional to the area and inversely proportional to the square of the distance, it might be expected that an electroadhesive clutch formed from a drum having a surface as smooth as possible and a band as flat and smooth as possible and wrapped about the drum would be most efficient. However, it has been discovered that this is not the case. When a smooth metal band is wrapped around a cylindrical clutch surface, the outer surface of the band is stretched and the inner surface compressed. These stresses in the band cause a slight transverse curvature, and the inner surface of the band is not congruent with the cylindrical clutch surface. The active area of the band is therefore considerably less than the nominal area and depends on the stresses in the band as to size, shape and location. According to the present invention, coacting surfaces presenting only a plurality of transverse areas or lines of contact, that is, a corrugated or rippled coacting surface, have been discovered to be more efficient and to provide a uniformly controlled active area. Not only does such a rippled coacting surface provide less no-voltage residual drag, but also provides greater torque, or clutching, when voltage is applied, together with uniformity of operating characteristics among the clutches so built.

Figure 4:
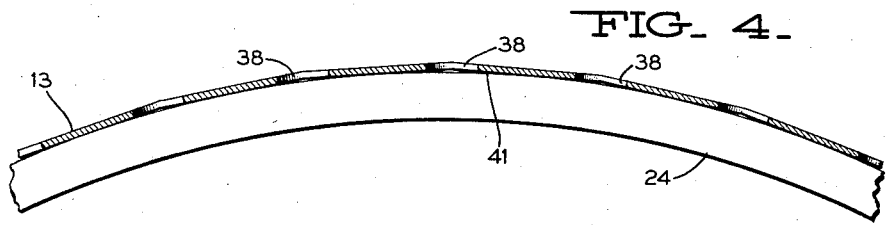
Fig. 4 is an enlarged fragmentary side view of a portion of the band of Fig. 3 together with a portion of the clutch drum.

Figs. 3 and 4 show a preferred form of clutch band 13 having a rippled surface 41. This band may be formed of tempered spring steel. In order to obtain the rippled surface for coaction with the clutch drum, rows of holes 38 are formed crosswise in the band. When the band is wrapped around the clutch drum, the band flexes along the rows of holes. This eliminates the transverse curvature and makes it somewhat polygonal in shape to give a rippled surface for engaging the clutch drum only along a plurality of transverse areas. With a clutch and band constructed as shown in Figs. 1 through 4, a residual drag of less than one inch pound and a torque of 80 inch pounds with voltage applied is obtained, for example, as compared to a residual drag of 10 inch pounds and a torque of 50 inch pounds for a clutch with a smooth band, all other factors being the same.

Figure 5:
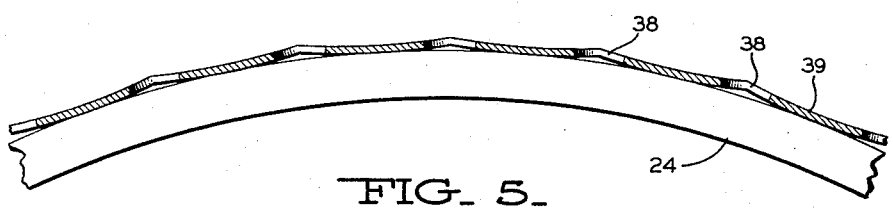
Fig. 5 is a slightly modified form of the band of Fig. 4.

Fig. 5 shows a slightly modified form of the band shown in Figs. 3 and 4. The band 39 of Fig. 5 may be formed by pulling the band over a small diameter rod to bend it along the rows of holes.

Figure 6:
Fig. 6 is still another modification of the band of Fig. 4.

Fig. 6 shows another modification of a clutch band. The rippled surface of band 40 may be formed by machining.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electroadhesive device comprising a semiconductive member, a conductive member superimposed on said semiconductive member and having a surface shaped to present a plurality of spaced transverse areas of contact with said semiconductive member, said areas of contact isolated from one another by separations between said members, means for imparting relative sliding motion to said members in a direction substantially perpendicular to said transverse areas of contact and means for applying an electrical potential difference between said members.

2. An electroadhesive device comprising a conductive member having a corrugated surface, a semiconductive member superimposed on said conductive member and having a second surface disposed to face and contact said corrugated surface and adapted to be slideably moved relative thereto along said corrugated surface in a direction substantially perpendicular to the corrugations, a lubricating dielectric film disposed between said surfaces, and means for applying an electrical potential difference between said surfaces to thereby effect electroadhesion.

3. An electroadhesive device comprising a cylinder of semiconductive material rotatable about its axis, a conductive band superimposed on said cylinder and having a corrugated contact surface slideably engaging said semiconductive cylinder to provide a plurality of spaced transverse areas of contact isolated from one another by separations between said cylinder and said band substantially parallel to the axis of rotation of said cylinder, and means for applying an electrical potential difference between said band and said cylinder.

4. An electroadhesive device comprising a drum of semiconductive material, a conductive band superimposed on said drum having a corrugated surface co-operating with said drum to provide a plurality of circumferentially spaced contact surfaces isolated from one another by separations between said drum and said band, means for imparting relative rotary sliding motion between said drum and said band, and means for applying an electrical potential difference between said band and said drum.

5. An electroadhesive device comprising a cylinder of semiconductive material rotatable about its axis, a conductive band superimposed on said cylinder having a corrugated surface co-operating with said cylinder to provide a plurality of circumferentially spaced contact surfaces isolated from one another by separations between said cylinder and said band, a film of lubricating dielectric disposed between said cylinder and said band, and means for applying an electrical potential difference between said cylinder and said band.

6. An electroadhesive device comprising a rotatable cylinder of semiconductive material, a conductive band superimposed on said cylinder and having a contact surface for slideably engaging said cylinder, said contact surface shaped to present a plurality of spaced transverse areas of contact isolated from one another by separations between said cylinder and said band substantially parallel to the axis of rotation of said cylinder, and means for applying an electrical potential difference between said band and said cylinder.

7. Apparatus according to claim 2 wherein said semi-conductive member is comprised of conductive particles bound in an insulating binder.

8. Apparatus according to claim 5 wherein said semi-conductive material is comprised of conductive particles bound in an insulating binder.

9. An electroadhesive device comprising a semi-conductive member having a first surface, a conductive member superimposed on said semi-conductive member and having a second surface for contacting said first surface, means for imparting relative sliding motion to said members and means for applying an electrical potential difference between said members, characterized by the fact that said surfaces are formed with a contour providing a plurality of areas of contact between said surfaces isolated from one another by separations between said surfaces transverse to the direction of motion imparted to said members.

References Cited in the file of this patent

UNITED STATES PATENTS

| | | |
|---|---|---|
| 1,533,757 | Rahbek | Apr. 14, 1925 |
| 2,025,123 | Rahbek | Dec. 24, 1935 |
| 2,148,482 | Lorenz | Feb. 28, 1939 |
| 2,175,354 | Lewin | Oct. 10, 1939 |
| 2,568,824 | Rahbek | Sept. 25, 1951 |